United States Patent [19]

Kwun

[11] Patent Number: 4,907,262
[45] Date of Patent: Mar. 6, 1990

[54] METHOD OF TRANSMITTING DUAL TONE MULTI-FREQUENCY DURING COMMUNICATION IN A PRIVATE BRANCH EXCHANGE USING KEYPHONES

[75] Inventor: Osul Kwun, Seoul, Rep. of Korea

[73] Assignee: Samsung Electronics Co. Ltd., Suwon, Rep. of Korea

[21] Appl. No.: 373,403

[22] Filed: Jun. 30, 1989

[30] Foreign Application Priority Data

Jun. 30, 1988 [KR] Rep. of Korea ............................ 8024

[51] Int. Cl.[4] ........................ H04M 3/22; H04Q 1/50
[52] U.S. Cl. ..................................... 379/281; 379/353
[58] Field of Search ........................ 379/281, 280, 353

[56] References Cited

U.S. PATENT DOCUMENTS 3,790,719  2/1924  Montague et al. ............. 379/281 X

FOREIGN PATENT DOCUMENTS 0221197 12/1984  Japan .................................. 379/353
0154798  8/1985  Japan .................................. 379/281
0013897  1/1989  Japan .................................. 379/281

*Primary Examiner*—Thomas W. Brown
*Attorney, Agent, or Firm*—Fleit, Jacobson, Cohn, Price, Holman & Stern

[57] ABSTRACT

A dual-tone multi-frequency (DTMF) transmission method to allow a keyphone user of a private branch exchange system (PBX) to send the DTMF signal according to dial digits depressed, through a DTMF sender built in the PBX itself, even though there is no DTMF generator in the keyphone on use, when the keyphone user needs to send the DTMF signal to the central office (C.O.) line to control devices that operate at reception of the DTMF signal during making a call to the C.O. line. The method comprises a plurality of control steps operated according to a flow chart of the attached figure.

1 Claim, 5 Drawing Sheets

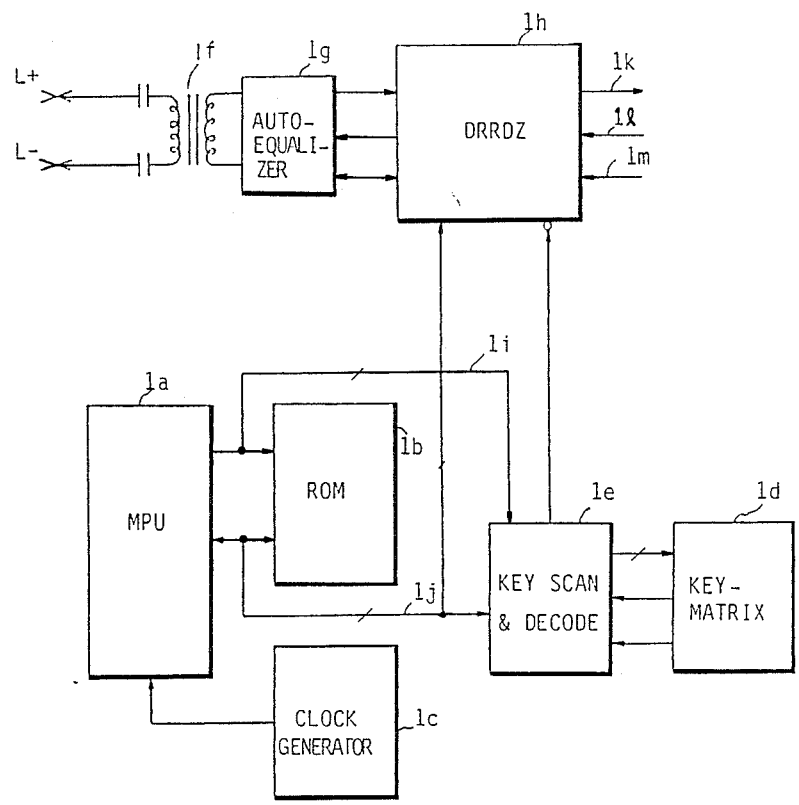
F I G. 1

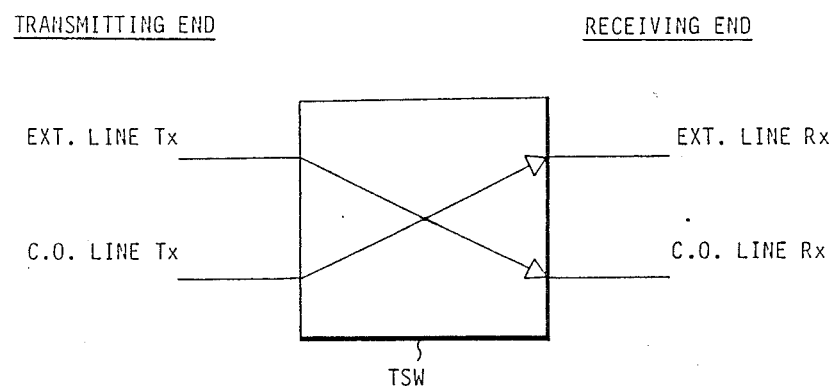
F I G. 4
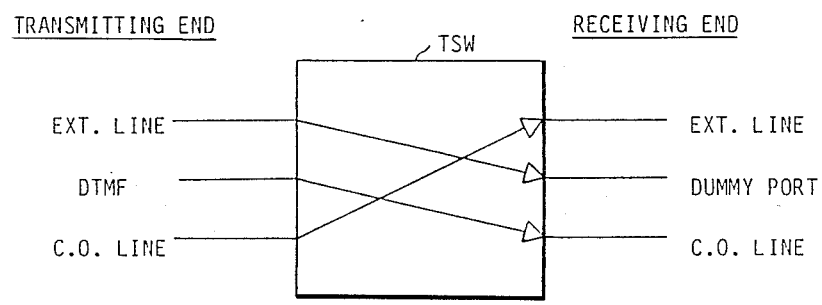
F I G. 5

METHOD OF TRANSMITTING DUAL TONE MULTI-FREQUENCY DURING COMMUNICATION IN A PRIVATE BRANCH EXCHANGE USING KEYPHONES

BACKGROUND OF THE INVENTION

The present invention relates to a method of transmitting dual tone multi-frequency (hereinafter, called DTMF) during communication with a central office line (hereinafter, referred to as "C.O. line") using a keyphone in a private branch exchange (PBX), specifically of sending DTMF to the C.O. line on 'busy' state by controlling DTMF sender in the PBX when the dialing digit keys of a keyphone are pressed.

At present, conventional PBXs have interface circuits that allow interface between the PBX and subscribers of ordinary-telephone extensions and subscribers of digital keyphones that can send digital data and voice signal, or of ordinary keyphones. According to the conventional method said digital keyphones or said ordinary keyphones of subscribers have two methods of sending dialing signals, that is, the one that sends dialing signal by having a built-in DTMF sender that can generate DTMF therein, and the other in which a built-in micro-processor recognizes the key-data of the key matrix that can generate dial digit and other functional data, changes the dialing key-signals to digital data and send it to the PBX. The former method, however, needs built-in DTMF sender in every telephone of subscribers, therefore it not only adds a cost rise factor but also causes some problems in sending dialing signals. The reason is that all the signals must be transformed into digital signals to be sent because all the signal transmissions are processed in the form of the digital signals in digital keyphones.

Therefore, in the case of keyphones, the latter method is gradually becoming popular that a built-in micro-processor sends data, such as dial key signals and digital signals of the key matrix from which function key signals can be generated at a key-press, in the form of dial data. But there has been still a problem described below in such a method that performs telephonic communication by entering dial digit data signals into PBX. When a subscriber has to send DTMF to the C.O. line to operate an answering phone or a home automation machine at the time of making a call towards the C.O. line from a keyphone in PBX, he has to face the problem of being unable to control those devices which operate by receiving DTMF, for there is no DTMF generator in the keyphone itself being used.

Therefore, a purpose of this invention is to provide keyphone users in a PBX system with a DTMF transmission method that allows them to send DTMF of the dial digits that they pressed, through a DTMF sender built in the PBX itself, even though there is no DTMF generator in the keyphone itself being used at present, when the keyphone user needs to send DTMF to the C.O. line to control the devices that operate at the reception of DTMF during making a call to the C.O. line.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIG. 1 is a block diagram of a portion of a keyphone used in a PBXs

FIG. 4 is a configuration chart of a speech path link between a central office line and a keyphone terminal of PBX before and after the present invention is performed;

FIG. 5 is a configuration chart of speech path links upon transmitting a dual tone multi-frequency to the central office line when the present invention is performed.

DESCRIPTION OF THE REFERENCE NUMERALS OF THE DRAWINGS

| | |
|---|---|
| 1a: Micro Processor | 1b: ROM |
| 1c: Clock Generator | 1d: Key Matrix |
| 1e: Key Scanning Decoding Circuit | 1f, 2c: Transformer & |
| 1g: Auto-equalizer | 1h: Data Recovery |
| 2b: OSC | 2d: TRD |
| 2e: DLT | 2f: Filter |
| 2g: Signal Data Transmission Part | 2h: Decoder |
| 2i: FIFO | 3a: First Buffer |
| 3b: Latch Circuit | |
| 3c: Dual Tone Multi-Frequency Generator | |
| 3d: Codec | 3e: Second Buffer |
| 3f: Third Buffer | 3g: Decoder |
| 3h: Port Decoder | 3i: Port Selector |
| 3j: Port Selector | |

DETAILED DESCRIPTION OF THE INVENTION

FIG. 1 is a block diagram of a portion of a keyphone used in a PBX and it comprises: a multi-processor(-hereinafter MPU) (1a) for controlling operation of the keyphone. ROM (read-only-memory) (1b) which has pre-designed program data and accesses built-in data at control of the MPU, a clock generator(1c) that generates and provides a period of clock to the MPU, a key-matrix(1d) which is equipped with dial keys and function keys and generates dial signals and function signals at the key selection, a key scanning and decoding circuit(1e) that decodes address signals from the MPU and produce outputs of control signals scanning and entering key-depressing status of the key-matrix into the MPU, a transformer (1f) that connects or disconnects electrical signals with the lines (L+, L−) of keyphone subscribers in the PBX system, an auto-equalizer (1g) that equalizes input/output signals of the transformer by a particular control, and a data recovery RZ data generator (DRRDZ)(1h) which is enabled by decoding signals of the key scanning and decoding circuit and transforms the dial digit data from the MPU into RZ (Return-to-Zero) data which is then sent through the auto-equalizer. Of the reference symbols, (1i) is address bus, (1j) is data bus, (1k) and (1l) are internal send/receive highways, and (1m) is clock input port.

Figure 2:
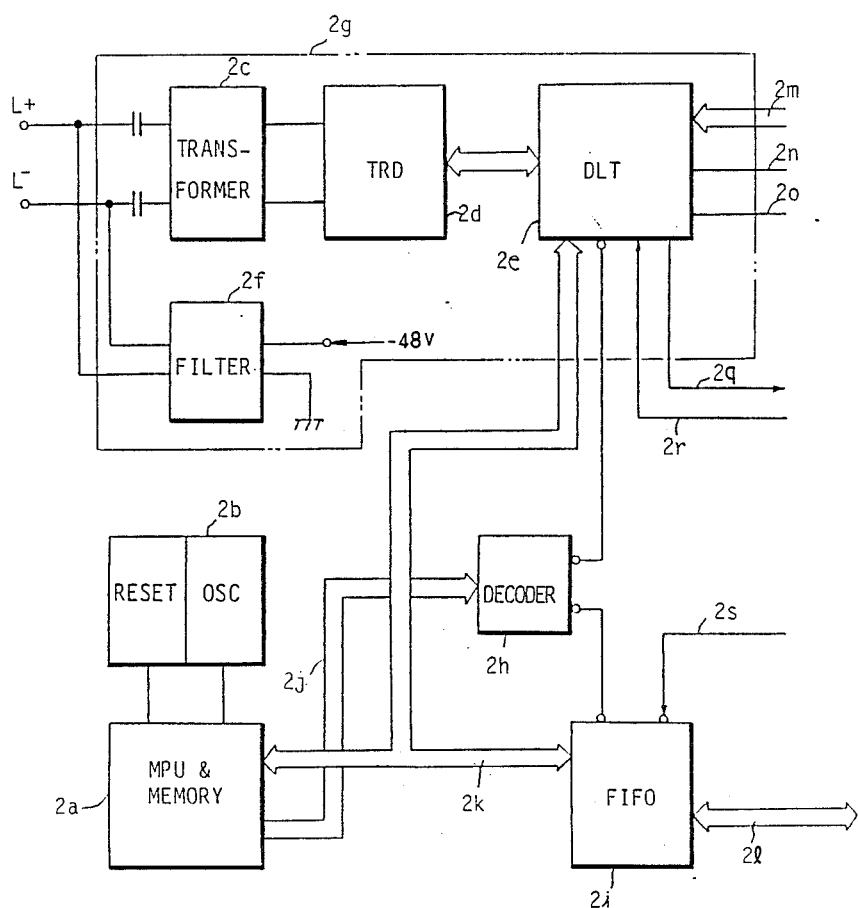
FIG. 2 is a block diagram of a keyphone terminal interface of a PBX.

FIG. 2 is a block diagram of a keyphone terminal interface of a PBX and it comprises: a micro-processor and memory (hereinafter, referred to as "CPME") (2a) which control operation of the interface system and store data in a random manner; an oscillator (2b) that generates operation clock of the CPME(2a); a reset(2p) that performs the reset operation of the CPME; a signal and data transmission part(2g) that is composed of a transformer(2c) that connects and disconnects electrical signals of the telephone lines (L+, L−) of the keyphone TRD(2d) which performs ping-pong converting of data transmission between keyphones through the transformer (2c) as well as AMI coding of the data to be trasmitted and decoding of the AMI data, DLT(2e) that performs format converting and bit alignment for data transmission with keyphone, and a filter(2f) that filters and provides power to the twist pair(L+)(L−) that are used for communication with keyphone; a decoder(2h) that controls the DLT(2e) by decoding the output address of CPME(2a); and a FIFO (First-in First-out Register) (2i) that records and sends the data according to a given sequence, under control of the CPME(2a). Of the reference symbols, 2j is address and control bus, 2k and 2l are data bus, 2m is clock input pulse, 2o is voice-channel control signal (voice channel allocation signal), 2n is data channel allocation control signal, 2q is transmission highway going to the exchange system, 2r is reception highway coming from the system, and 2s is FIFO read control signal entered from the central processing unit of the system. In the above configuration of the FIG. 2, eight units of the signal and data transmission parts 2g are installed in the keyphone subscriber (terminal) interface.

Figure 3:
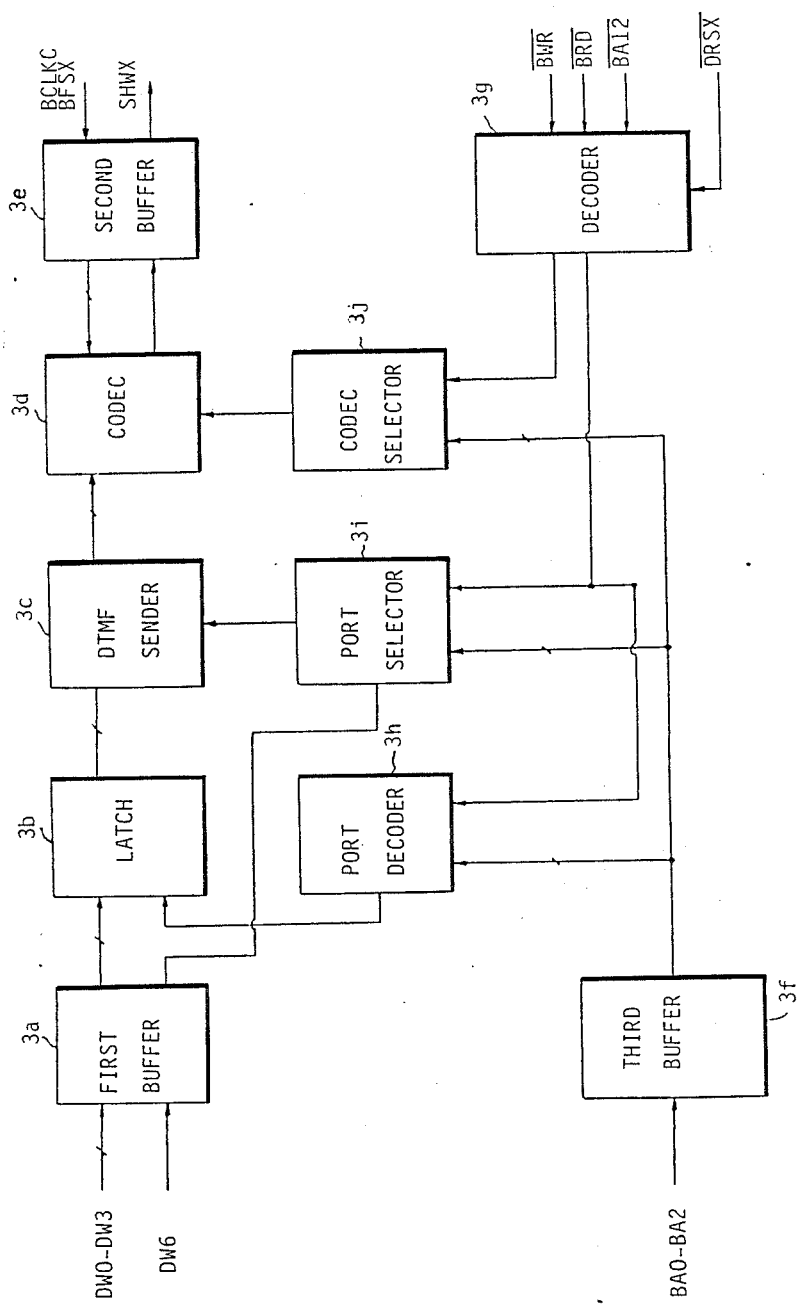
FIG. 3 is a block diagram of a dual tone multi-frequency transmission unit of a PBX.

FIG. 3 is a block diagram of a DTMF transmission unit installed in a PBX, and it comprises: a first buffer(3a) that provides a buffer for signals of the dial digit data (DW0-DW3) and the tone control data(DW4), a latch circuit(3b) that latches the data of the first buffer, DTMF sender(3c) that produces DTMF signals corresponding to the output data of the latch circuit, a codec(3d) that codes and produces DTMF outputs of the DTMF sender according a given clock, a second buffer(3e) that inputs clocks (BCLKC, BFSX) to the codec and sends output from the codec to the subhighway(SHWX), a third buffer(3f) that provides a buffer for addresses(BA0-BA2), a decoder (3g) that sends control signals by decoding write(BWR), read(BRD) and addresses, a port decoder(3h) that latches the latch circuit by the outputs of the third buffer and the decoder, a port selector(3i) that enables DTMF generator, and a codec selector(3j) that selects the codec. Of the said signals described above , DW0-DW3, DW6, BA0-BA2, BWR, BRD and BA12 are signals coming from the central processing unit (not shown) of the PBX.

FIG. 4 is the configuration before and after establishing a speech path between a keyphone terminal of PBX and the C.O. line, wherein the TSW is a time switch in the PBX.

FIG. 5 is the configuration of establishing a speech path when sending DTMF to the C.O. line by performing the present invention, wherein the transmission port for extension telephones is linked with the dummy tone port and transmission channels of the transmission part are linked with the C.O. line reception port.

Figure 6:
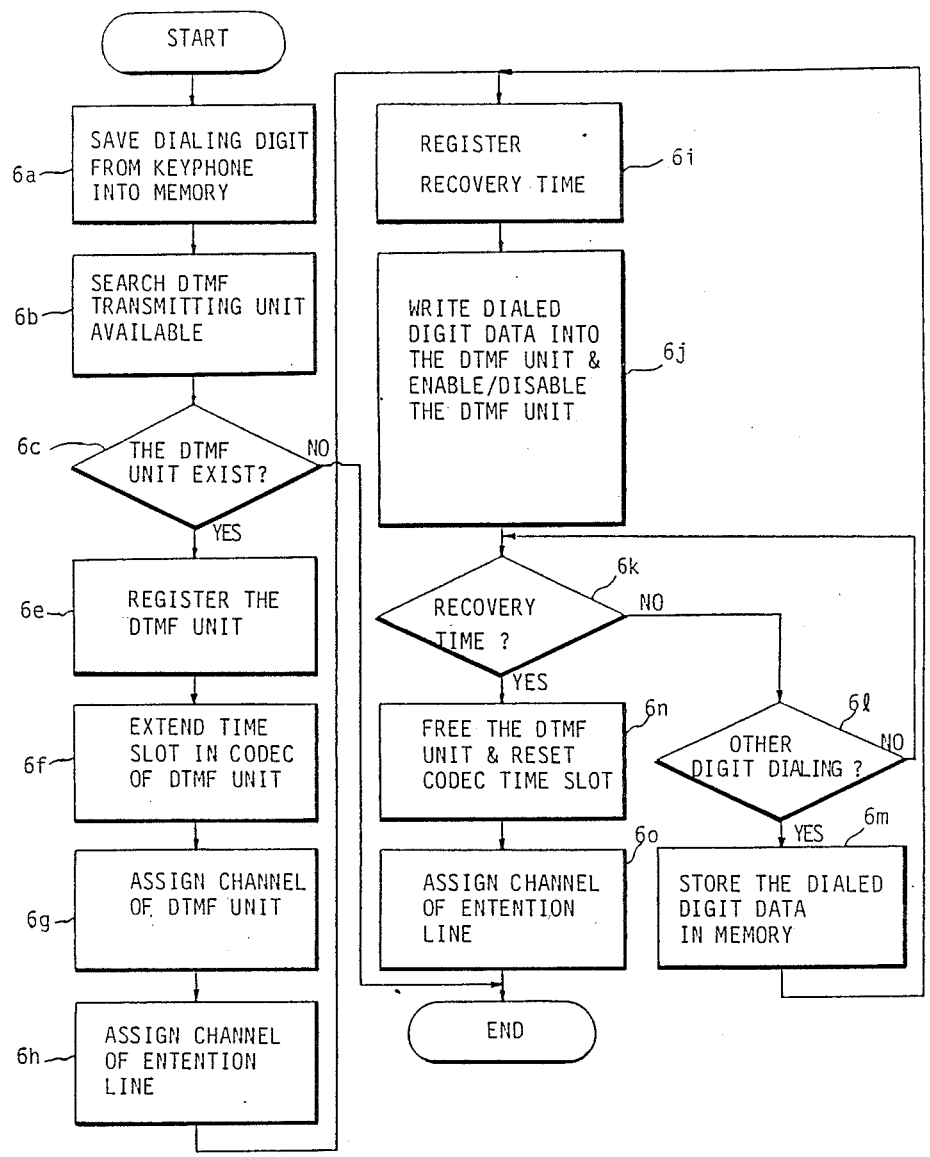
FIG. 6 is a flow chart of transmitting a dual tone multi-frequency according to the present invention.

FIG. 6 is a flow chart according to the present invention, wherein it comprises:

a first step of seizing the C.O. line, saving digits dialed at the keyphone in the dial buffer and checking if there are any data to be DTMF-processed in the idle DTMF sender;

a second step of setting and registering in a designated memory area the data that the checked DTMF sender is being used on software-base and allocating time slots in the said DTMF sender;

a third step of allocating DTMF sender's channel to the reception part of the central-office line on its speech path, allocating reception channels for extension lines to dummy tone port, and registering a recovery time for speech path between the central-office line and the keyphone.

a fourth step of recording dial digits of the first step in the DTMF sender, sending DTMF by enabling the DTMF sender, and then blocking the transmission of DTMF by disabling the DTMF sender;

a fifth step of checking if recovery time has reached by the call registered in the third step;

a sixth step of freeing the DTMF sender if the registered time has passed in the fifth step, and allocating trasmission channel for extension lines to the C.O. line speech path part; and a seventh step of checking if another dial digits are entered from keyphones when the recovery time hasn't been reached in the fifth step, and if not entered, performing the sixth step again, or if entered, saving entered dial digits in the dial buffer and registering recovery time of establishing the speech path between keyphone and the C.O. line, and trying again from the fourth step.

Hereinafter, operation of the present invention is described in detail with the attached drawings. FIG. 4 shows how a speech path is established in a PBX during a telephonic communication with the C.O. line; herein transmission channel of the extension telephone(keyphone subscriber) is linked with the reception channel of the C.O. line and the transmission channel of the C.O. line is linked with reception channel of the extension phone, thus a telephpone conversation being enabled. Accordingly, when a subscriber with DTMF sender in his telephone dials to send DTMF to the C.O. line, DTMF generated in his telephone is sent to the C.O. line through the speech path as in the FIG. 4. But, when a subscriber of a PBX dials digits on a keyphone using the keys in the key-matrix as in the FIG. 1, the digits are read by the keyphone key scanning logic(1e), data is generated in the DRRDG(1h) and sent to the transformer(2c), which is the keyphone's interface in the PBX, in the FIG. 2 through the equalizer circuit of auto-equalizer(1g) and transformer(1f).

Digital modulation data of the dial digits generated from the keyphones in the FIG. 1 are decoded by TRD(2d) and DLT(2e). At this time the DLT(2e) is enabled and activated as the decoder decodes and sends the address signals which are periodically accessed in the CPME(2a), in which the DLT(2e) is accessed by the CPME through the data bus(2k). Dial digit data accessed from keyphone is saved in the FIFO(2i) according to their arrival sequence by the control of CPME(2a), and these data saved in the FIFO(2i) are accessed through the data bus(2l) by contol signals from line(2s) sent by a central processing unit of the PBX which is not shown herein. That is, digits dialed on the keyphone in the FIG. 1 are sent to the signal and data transmission part(1g), which is then sent to the central processing unit of the PBX through the FIFO(2i) by the CPME in the interface card of the keyphone. When the central processing unit of the PBX recognizes digits dialed by a keyphone subscriber, sending DTMF to the C.O. line gets started.

When dial digits are entered by the central processing unit through the route described above, the digits dialed on the keyphone are saved in a memory such as dial buffer in the step 6a, and available DTMF sender is then searched in the step 6b (typically, there are eight DTMF senders in a PBX). If a free DTMF sender is found in the step 6c, the data showing that the DTMF sender is used is now being set on a table in the software in the step 6e, but if not found, the central processing unit of the PBX sends "busy" tones and stops the process for the time being. And then it again searches for an available DTMF sender when digits are dialed again on the keyphone.

The central processing unit, after registering the data that DTMF is being used in the step 6e, enters BWR, BRD, BA12, DRSX into the decoder(3G) and BA0--BA2 into the third buffer(3f) in the step 6f as in the FIG. 2 to operate the known DTMF. From the codec selector(3j)'s selection of Codec(3d) by outputs of the said third buffer and the decoder(3g), BCLKC passed through the second buffer(3e) is applied into the codec (3d) and time slots are allocated.

The central processing unit balances the time switch by controling the speech path on the TSW, in the step 6g, as in the FIG. 4 to allocate transmission highway channel of DTMF sender of the FIG. 3 to the reception port(RX) of the C.O. line on the time switch(TSW), and assigning transmission channel for the extension keyphone to the dummy tone port in the step 6h. Accordingly, the time switch can enable DTMF transmitted from the DTMF sender to be sent to the C.O. line reception port(RX) as the speech paths of the C.O. line, the extension line and the DTMF sender are established as in the FIG. 5. After DTMF is sent to the C.O. line by the DTMF sender, the time is registered in a memory in the step 6i for the speech path to be recovered after certain length of time as in the FIG. 4 to re-establish a communication between the C.O. line and the keyphone subscriber.

Having performed the step 6i, the central processing unit accesses digits which were dialed by a keyphone subscriber and saved in a memory, writes these digits to the entry port DW0-DW3 of the FIG. 2, and enables the DTMF sender by setting DW6 to logic "high". Following this, DTMF, equivalent to the said DW0-DW3, is generated by the codec(3d) and sent to the highway(SHWX) through the buffer(3e). After a certain length of time has passed, the DW6 is reset to logic "low" disabling DTMF sender(3c) to block continued sending of the DTMF. In the step 6k, there is checked whether the time length previously registered in the step 6i has been over or not, in order to recover the speech path established of the FIG. 5 as in the FIG. 4, once DTMF of the dialed digits has been sent to the C.O. line.

When sending DTMF to the C.O. line is completed after the speech path recovery time is passed in the checking step 6k, the central processing unit frees, in the step 6n, the DTMF sender of the FIG. 3 on software-base and resets the assigned channel by disabling the codec(3d) using BWR, BRD, BA12, and DRSX of the FIG. 3. The central processing unit, having performed the 6n step, reallocates the channel of the extension line to the reception part of the C.O. line and establishes a speech path between the C.O. line and a keyphone subscriber. By this, the operation is completed that digits dialed by a subscriber is converted into DTMF signals and sent to the C.O. line.

If the recovery time for the speech path hadn't been reached in the step 6k, the central processor unit checks whether or not any other dial digits have been entered from a keyphone in the step 6l, wherein, if entered, it saves the dial digits in a memory(dial buffer) and performs the step 6i again. That is, if the central processing unit recognizes that a keyphone subscriber dialed another digits before the speech path between the C.O. line and extension line is recovered, it saves dialed digits for DTMF in a memory(dial buffer) and sends DTMF to the C.O. line by the steps described above.

The present invention presents such an advantage; that when a speech path is established over the C.O. line between a subscriber in a PBX system that uses keyphones and a device that operates upon reception of DTMF from the subscriber side, digits dialed on a keyphone can be converted into equivalent DTMF signals within the PBX and then sent to the C.O. line to operate the device that reponds to the DTMF signals, even though the keyphone terminal itself doesn't have any DTMF generator, thus more services are made possible for keyphone subscribers in PBX system.

What is claimed is:

1. A DTMF (dual-tone multi-frequency) transmission method during a telephonic communication on a central-office line, in a private branch exchange system comprising keyphones that generate a certain form of dial digit data but not the equivalent DTMF signal for the data within itself, said method comprising:

first step of seizing a central-office line, saving digits dialed on a keyphone during a telephonic communication, in a dial buffer and checking if there is any DTMF sender available;

second step of setting and registering in a memory area the data showing that the searched DTMF senders are in use of software-base, and allocating time slots in said DTMF sender;

third step of allocating DTMF sender's channel to the reception part of the central-office line on its speech path, allocating reception channels for extension lines to dummy tone port, and registering a recovery time for speech path between the central-office line and the keyphone;

fourth step of recording dial digits of the first step in the DTMF sender, sending DTMF by enabling the DTMF sender, and blocking DTMF transmission by disabling the same DTMF sender after a given length of time;

fifth step of checking if a speech path recovery time registered in said third step has been reached or not;

sixth step of freeing the DTMF sender if the registered time has passed in said fifth step and allocating transmission channels of extension line to the speech path on the central-office line; and seventh step of checking if any other dial digits are entered from keyphones when the recovery time hadn't been reached in said fifth step, and if not entered, performing said sixth step, or if entered, saving the entered dial digits in the dial buffer, registering a recovery time for speech path between the central-office line and a keyphone and then repeating this process from said fourth step.

* * * * *